United States Patent
Aengeneyndt et al.

(10) Patent No.: US 9,121,136 B2
(45) Date of Patent: Sep. 1, 2015

(54) MACHINE FOR PRODUCING A FIBER WEB

(71) Applicant: VOITH PATENT GMBH, Heidenheim (DE)

(72) Inventors: Kerst Aengeneyndt, Syrgenstein (DE); Martin Breineder, Natschbach (AT); Hubert Bischof, Muerzzuschlag (AT); Mathias Schmitt, Munich (DE)

(73) Assignee: Voith Patent GmbH, Hedenheim (DE)

( * ) Notice: Subject to any disclaimer, the term of this patent is extended or adjusted under 35 U.S.C. 154(b) by 0 days.

(21) Appl. No.: 14/381,670

(22) PCT Filed: Feb. 26, 2013

(86) PCT No.: PCT/EP2013/053793
§ 371 (c)(1),
(2) Date: Aug. 28, 2014

(87) PCT Pub. No.: WO2013/127777
PCT Pub. Date: Sep. 6, 2013

(65) Prior Publication Data
US 2015/0013927 A1    Jan. 15, 2015

(30) Foreign Application Priority Data
Feb. 28, 2012  (DE) .................. 10 2012 203 035

(51) Int. Cl.
*D21F 3/08*    (2006.01)
*D21F 3/06*    (2006.01)
(Continued)

(52) U.S. Cl.
CPC .. *D21F 3/08* (2013.01); *D21F 3/06* (2013.01); *D21F 5/181* (2013.01); *D21G 1/0233* (2013.01);
(Continued)

(58) Field of Classification Search
CPC ....... G01L 5/0085; G01L 5/045; G01L 1/246; G01L 1/24; G01L 5/102; D21F 3/06; D21F 3/08; D21F 1/181; G01K 11/04; G01K 1/026; G01K 13/08; G01K 2213/00; F16C 13/00; F16C 41/008; D21G 1/004; D21G 1/02; D21G 1/0233; D21G 1/0286
USPC ............ 162/263, 358.1, 358.3, 358.5, 359.1, 162/360.2, 360.3; 492/9, 10, 20; 73/862.5, 73/862.8; 374/130
See application file for complete search history.

(56) References Cited

U.S. PATENT DOCUMENTS 5,048,353 A * 9/1991 Justus et al. ................ 73/862.55
5,383,371 A * 1/1995 Laitinen .................... 73/862.55
(Continued)

FOREIGN PATENT DOCUMENTS

CA    2348280 A1 *  8/2000
CA    2417515 A1 *  7/2003
(Continued)

*Primary Examiner* — Jose Fortuna
(74) *Attorney, Agent, or Firm* — Laurence A. Greenberg; Werner H. Stemer; Ralph E. Locher

(57) ABSTRACT

A machine for producing and/or processing a fiber web, in particular a tissue web, includes a press roll and a mating roll which forms a nip with the press roll and the circumferential surface of which has a contour running in the cross-machine direction which, during operation of the machine, changes as compared with when the machine is at a standstill. The press roll has a roll core and a roll cover surrounding the roll core. Multiple pressure and/or temperature sensors are disposed in the roll cover and/or between the roll core and the roll cover. The pressure and/or temperature sensors are spaced apart differently far from one another in the cross-machine direction of the press roll, at least in some areas.

12 Claims, 2 Drawing Sheets

(51) Int. Cl.
  *G01L 1/24* (2006.01)
  *G01L 5/00* (2006.01)
  *G01K 1/02* (2006.01)
  *D21F 5/18* (2006.01)
  *D21G 1/02* (2006.01)
  *G01K 13/08* (2006.01)

(52) U.S. Cl.
  CPC .............. *D21G 1/0286* (2013.01); *G01K 1/026* (2013.01); *G01K 13/08* (2013.01); *G01L 1/246* (2013.01); *G01L 5/0085* (2013.01); *G01K 2213/00* (2013.01)

(56) References Cited

U.S. PATENT DOCUMENTS

| | | | |
|---|---|---|---|
| 5,592,875 A * | 1/1997 | Moschel | 100/99 |
| 6,568,285 B1 * | 5/2003 | Moore et al. | 73/862.55 |
| 7,392,715 B2 * | 7/2008 | Moore et al. | 73/862.55 |
| 2005/0278135 A1 * | 12/2005 | Murphy | 702/130 |
| 2006/0020418 A1 * | 1/2006 | Moore et al. | 702/170 |
| 2010/0324856 A1 * | 12/2010 | Pak | 702/138 |
| 2011/0226070 A1 * | 9/2011 | Berendes et al. | 73/862.55 |
| 2011/0301003 A1 * | 12/2011 | Gustafson et al. | 492/10 |
| 2012/0310596 A1 * | 12/2012 | Gustafson et al. | 702/170 |
| 2014/0257719 A1 * | 9/2014 | Figiel | 702/41 |

FOREIGN PATENT DOCUMENTS

| | | | |
|---|---|---|---|
| DE | 102007000846 A1 * | 4/2009 | |
| DE | 102012203035 A1 * | 8/2013 | |
| WO | WO 9625288 A1 * | 8/1996 | |
| WO | WO 2005113892 A1 * | 12/2005 | |
| WO | WO 2010034321 A1 * | 4/2010 | |
| WO | WO 2012113747 A1 * | 8/2012 | |

* cited by examiner

MACHINE FOR PRODUCING A FIBER WEB

BACKGROUND OF THE INVENTION

Field of the Invention

The invention relates to a machine for the industrial production of a fiber web, in particular a hygienic paper or tissue web, having a press roll and a mating roll which forms a nip with the press roll and the circumferential surface of which has a contour running in the cross-machine direction which, during operation of the machine, changes as compared with when the machine is at a standstill, the press roll has a roll core and a roll cover surrounding the roll core, and multiple pressure and/or temperature sensors are disposed in the roll cover and/or between roll core and roll cover.

In order to form a fiber web in industrial papermaking, first of all a suspension is applied to a carrier, such as a wire, and initially dewatered. After the sheet formation, the dewatering is continued in following sections of the machine, until finally a self-supporting fiber web is produced. During the dewatering process, the fiber web, which is not yet self-supporting, is generally transferred to other carriers, for example felts or other wires. In the wet end of a machine, the fiber web, together with the carrier respectively supporting it, is led through a series of nips, in which the fiber web is pressed and placed under pressure. The pressure profile forming in the nips has a substantial influence on the efficiency with which the fiber web is dewatered and smoothed. In the event of a non-uniform pressure distribution in the nip, the fiber web has a non-uniform moisture profile and/or inadequate smoothing. Papermakers are therefore concerned about monitoring the pressure profiles in the nips.

The rolls used normally have a roll core, which absorbs the loading. Depending on the phase of the production process in which the fiber web is processed, the surfaces of the rolls that come into contact with said fiber web must have different properties. Therefore, in the region of the circumferential surface of the roll which comes into contact with the fiber web, the rolls are generally provided with a so-called roll cover which has the respectively desired properties. Here, the roll cover can also be built up in multiple layers.

In order to monitor the pressure profile in the nip during continuous operation, sensors can be used. The sensors are usually arranged on the outer circumferential surface of the roll core or within the roll cover. Forces acting radially in relation to the roll geometry are usually measured by using piezoelectric or electromechanical sensors. Both types of sensor generate an electric signal, which is representative of the deformation thereof under the respective pressure conditions. Since the rotational speed of the rolls in modern paper machines is very high, the sensor signal values are preferably transmitted to external processing equipment via radio.

Instead of sensors operating with electric means, fiber-optic sensors can also be used, in which the optical properties of an optical waveguide, such as a glass fiber, are changed by the deformation stress transmitted to the optical waveguide. In the international patent application PCT/EP2008/08050, a description is given of fiber-optic sensors for use in roll covers for paper machines, which use fiber Bragg gratings inscribed in glass fibers as sensor elements. Fiber Bragg gratings are optical interference filters arranged in optical waveguides, which are inscribed in the optical waveguide, for example by means of a laser. Wavelengths which lie within the predefined filter bandwidth around $\lambda_B$ are reflected. With regard to the functioning of fiber Bragg gratings, reference is made to the entire content of the disclosure of WO2010/034321 A1.

During the production of so-called tissue or hygienic papers, the requirements on the monitoring of pressure and/or temperature profiles are even more difficult, since the Yankee drying cylinders used in tissue machines are deformed by diverse influences during the continuous operation of the machine. The deformation is manifested in particular in the edge regions, viewed in the cross-machine direction, so that the monitoring thereof is particularly important and should be carried out with high accuracy.

BRIEF SUMMARY OF THE INVENTION

It is thus an object of the invention to specify a machine for producing a fiber web which has suitable measures that make such monitoring possible in an efficient way.

The above object is achieved by a machine for producing and/or processing a fiber web in particular a tissue web, having a press roll and a mating roll which forms a nip with the press roll and the circumferential surface of which has a contour running in the cross-machine direction which, during operation of the machine, changes as compared with when the machine is at a standstill, wherein the press roll has a roll core and a roll cover surrounding the roll core, and multiple pressure and/or temperature sensors are disposed in the roll cover and/or between roll core and roll cover, the pressure and/or temperature sensors being spaced apart differently far from one another in the cross-machine direction of the press roll, at least in some areas. Preferred developments will be found in the sub claims.

The invention provides pressure and/or temperature sensors which are spaced apart differently far from one another in the cross-machine direction of the press roll, at least in some areas.

According to a preferred exemplary embodiment of the invention, the pressure and/or temperature sensors in edge regions of the press roll, as seen in the cross-machine direction, have smaller spacings from one another than in a central region of the press roll, as seen in the cross-machine direction. As a result, it is possible to ensure that the monitoring of the critical edge regions can be carried out in fine detail.

According to one aspect of the invention, the mating roll is a drying or Yankee cylinder which, during the operation of the machine for producing a fiber web, has a profile in the cross-machine direction which is curved, at least in some sections, in particular one that is concave or convex, at least in some sections.

Advantageously, some of the pressure and/or temperature sensors can be formed as fiber Bragg gratings, which are arranged on at least one optical waveguide in such a way that, along the extent of the optical waveguide, sections of the at least one optical waveguide which each contain a fiber Bragg grating alternate with sections of the at least one optical waveguide which are free of fiber Bragg gratings.

Preferably, sections of the at least one optical waveguide which each contain a fiber Bragg grating enclose an angle of less than 80° and in particular less than 60° and more particularly less than 45° with a circumferential direction of the press roll. This ensures that the deformations experienced by the roll cover during operation can act optimally on the sensors. Excessively large angles lead to an excessively low deformation and can thus lead to distortion of measurements.

According to an advantageous refinement of the invention, sections of the same optical waveguide which each contain a fiber Bragg grating are arranged adjacently, as seen in the cross-machine direction of the press roll.

According to a preferred configuration variant, sections of the same optical waveguide which each contain a fiber Bragg grating are arranged in a region which extends in the cross-machine direction over at least part of the length in the cross-machine direction of the press roll, and the extent of which in the circumferential direction is less than 15 cm and in particular less than 5 cm and more particularly less than 3 cm. This makes it possible to form a line of sensors which pass through the nip approximately simultaneously and thus permit simultaneous measurements over the entire width of the press roll.

Alternatively, sections of the same optical waveguide which each contain a fiber Bragg grating can also be arranged along a helical curve described on the surface of the press roll, wherein a deviation from the helical curve, both in the cross-machine direction of the press roll and in the circumferential direction of the press roll, is less than 15 cm and in particular less than 5 cm and more particularly less than 3 cm.

Furthermore, provision can advantageously be made for multiple optical waveguides, wherein adjacent sections of different optical waveguides, which sections each contain a fiber Bragg grating, are arranged in a region which extends in the circumferential direction over the entire circumference of the press roll and the extent of which in the cross-machine direction of the press roll is less than 10 cm and in particular less than 3 cm and more particularly less than 3 cm. By means of this type of arrangement, a particularly dense network of sensors over the entire surface of the roll and particularly simple evaluation are possible, since the signals from the various optical waveguides do not have to be measured and evaluated during each passage through the nip.

According to further preferred aspects of the invention, fiber Bragg gratings of the same optical waveguide which are spaced apart in the direction in which the at least one optical waveguide extends can be designed to reflect light of different wavelengths or the same wavelength.

According to one aspect of the invention, at least one end of the at least one optical waveguide is led out of the press roll in order to make contact with an evaluation unit which further processes the signals from the sensors.

Advantageously, the roll cover of the press roll can have multiple layers, wherein the at least one optical waveguide is arranged between two layers of the roll cover or is embedded in one of the multiple layers. As a result, optimal positioning of the sensors can be achieved, depending on the requirements on the position of the press roll and in a manner matched to the nature of the roll cover.

BRIEF DESCRIPTION OF THE SEVERAL VIEWS OF THE DRAWING

The invention will be described in more detail below by way of example and with reference to the figures, in which.

DESCRIPTION OF THE INVENTION

Figure 1:
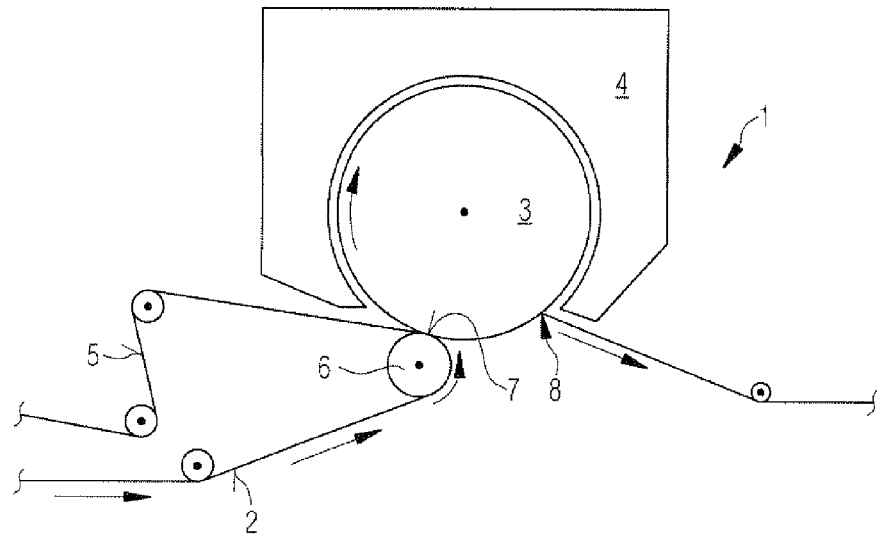
FIG. 1 shows a highly schematic lateral illustration of a machine for producing tissue paper, which is suitable for the application of the measures according to the invention.

FIG. 1 shows a very highly schematic lateral view of an extract from a machine 1 which is suitable for producing a fiber web 2. The papers that can be produced with this type of machines 1 are designated hygienic or tissue papers.

The machine 1 comprises a drying cylinder 3 which, according to current nomenclature, is also designated a Yankee cylinder 3, and a dryer hood 4, which at least partly encloses the Yankee cylinder 3. For reasons of clarity, the representation and description of further components is omitted at this point, since machines 1 of this type have been known for a long time.

The fiber web 2—coming from a forming section not illustrated in FIG. 1—is guided in the direction identified by arrows in FIG. 1 on a paper machine clothing 5 in the direction of the Yankee cylinder 3 and transferred to the Yankee cylinder 3 by means of a press roll 6. Here, pre-dewatering of the fiber web 2 is carried out before the latter is dried on the Yankee cylinder 3. At this point, the main focus of attention is that the fiber web 2 is not excessively highly compacted and does not lose its so-called bulk, which is critical for the subsequent properties of the tissue paper.

The Yankee cylinder 3 can be heated from the inside by means of steam by means of measures not specifically illustrated, so that, after the passage through a nip 7 between press roll 6 and Yankee cylinder 3, the majority of water still present in the fiber web 2 can be removed. The dryer hood 4 is used for heat retention in the area of the Yankee cylinder 3, in order to improve the drying performance in relation to the input of energy.

Following the drying operation, the fiber web 2 is taken off the Yankee cylinder 3 by means of a creping doctor 8 and is guided further in the direction of the reel-up, not further illustrated.

In order to be able to monitor and control the dewatering in the nip 7 between the press roll 6 and the Yankee cylinder 3, it is expedient to measure the pressure and/or temperature distribution in the nip 7. However, the measurement of such a pressure and/or temperature profile is possible and practical only when the Yankee cylinder 3 is heated and the machine 1 is running. The reason for this is that various influences during operation cause a deformation of the Yankee cylinder 3; the latter therefore has a different shape than when the machine 1 is at a standstill. This deformation depends, amongst other things, on the speed of rotation, the steam pressure, the steam temperature and the line load of the press roll 6. Overall, the deviations can be up to 2 mm, the values varying particularly highly in the edge regions, as viewed in a cross-machine direction.

If the variations are not monitored and corrected, over-pressing in the edge regions can lead to web breaks, for example. Local over-pressing, which can occur over the entire width, can lead to problems in reeling up, since thicker and thinner sections of the fiber web 2 make the reels non-uniform. Apart from that, the quality of the end product is also unsatisfactory if thickness fluctuations occur on account of over-pressing.

In order to counteract the deformations described, the changes to be expected during operation are partly anticipated by means of a pre-deformation of the roll surfaces, what is known as crowning. However, since the Yankee cylinder 3 also experiences further changes during its lifetime, such as a removal of material as a result of grinding, these pre-deformations can also exhibit only a limited effect.

Figure 4:
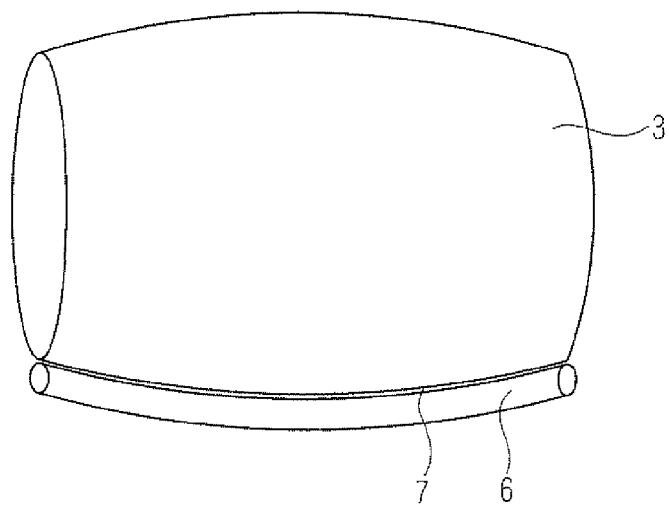
FIG. 4 shows a highly schematic view of the profile, curved in the cross-machine direction during operation, of a press roll and the mating roll of the latter.

In FIG. 4, the situation between the press roll 6 and the Yankee cylinder 3 is illustrated highly schematically and exaggerated for the purpose of clarification. The Yankee cylinder 3 has a convex deformation. Accordingly, the surface of the press roll 6 can have a slightly concave deformation, although this does not turn out to have the same extent as the deformation of the Yankee cylinder 3. The reason for this is that, although the roll cover 10 of the press roll 6 is formed as a resilient cover, the press roll is not of crowned construction. Accordingly, as seen in the cross-machine direction, the press roll 6 sees a higher pressure in a central region 13 then in edge regions 12, so that it is desirable to intensify the monitoring of the edge regions 12.

Accordingly, it is desirable to keep the pressure and/or temperature conditions in the nip 7 between Yankee cylinder 3 and press roll 6 under observation during operation and, in this case, to pay particular attention to the edge regions 12.

The invention provides for the press roll 6 to be provided with suitable sensors 11, which make it possible to monitor the pressure and/or the temperature in the nip 7 continuously.

Figure 2:
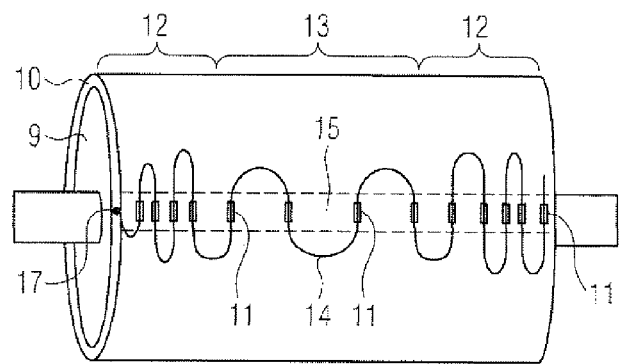
FIG. 2 shows a highly schematic view of a press roll which is configured in accordance with a first exemplary embodiment of the invention.
Figure 3:
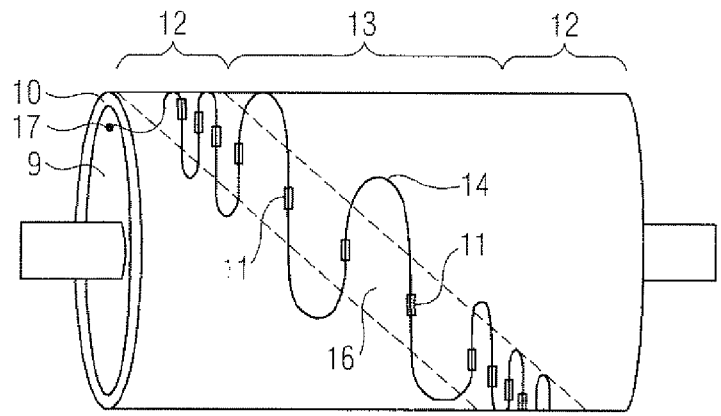
FIG. 3 shows a highly schematic view of a press roll which is configured in accordance with a second exemplary embodiment of the invention.

FIGS. 2 and 3 show, by way of example, press rolls 6 which are populated with multiple sensors 11 for measuring pressure and/or temperature.

Usually, a roll having a resilient roll cover 10, which is applied to a hard roll core 9, is provided at the position of the press roll 6 under consideration. Suitable materials for the roll cover 10 are, for example, rubber or polyurethane, while the roll core 9 can consist of metal or a fiber composite material, for example. The roll cover 10 is kept soft in order to obtain the bulk of the fiber web 2.

The sensors 11 are preferably designed in the form of fiber Bragg sensors. Here, what are known as Bragg gratings are inscribed in an optical waveguide 14, each acting in a reflecting manner for defined wavelengths when light is transmitted through the optical waveguide 14. The optical waveguide 14 is usually a glass fiber.

If FIG. 2 is considered, it can be seen that an optical waveguide 14 which has sensors 11 at defined positions is provided. Because of their characteristics, the sensors 11 must be aligned substantially in a circumferential direction of the press roll 6. An angle between the longitudinal extent of the sensors 11 and the circumferential direction should be below 80°, preferably below 60°, particularly preferably below 45°.

For this reason, the optical waveguide 14 is laid in a meandering manner, since although glass fibers normally withstand very high tensile forces, they must not be bent at excessively small radii. The meandering laying can be seen well in FIG. 2.

As can also be seen, the sensors 11 are arranged in a region 15 which extends substantially over the width of the press roll 6 and has an extent of less than 15 cm, preferably less than 5 cm, particularly preferably less than 3 cm. The sensors 11 are thus arranged substantially on a line.

According to the invention, the sensors in the edge regions 12 are spaced apart differently far from one another as compared with the central region 13. As FIG. 2 reveals, the spacings between the individual sensors 11 in the edge regions 12 are smaller than in the central region 13. As a result, close monitoring of the pressures and/or temperatures in the edge regions 12 is ensured. In the central region 13, the spacings of the sensors 11 from one another can be chosen to be somewhat wider, since in this region the aforementioned deformations of the Yankee cylinder 3 are not so highly pronounced and are partly compensated by means of crowning.

Here, the sensors 11 are formed substantially over the entire width of the fiber web 2 and preferably over the entire width of the roll cover 10. In addition, sensors 11 can also further be provided in the region of a so-called edge clearance, where the radial thickness of the roll cover 10 decreases, in order to obtain measured values in the case of a wandering fiber web 2.

A further exemplary embodiment of the measures according to the invention is illustrated in FIG. 3. Here, the optical waveguide 14 is arranged in a helical form, which can extend over the entire area of the roll cover 10. It is also possible for multiple turns to be provided. However, as already described in FIG. 2, the sensors 11 are again arranged in a narrow region 16 of similar dimensioning to that in FIG. 2 and lie substantially on a line. Their alignment with respect to the circumferential direction of the press roll 6 also follows the same requirements.

It is furthermore possible to provide not just one but multiple optical waveguides 14, which can be arranged so as to be distributed over the area of the press roll 6. These can be arranged either in the cross-machine direction, substantially parallel to the direction of the roll axis, as in FIG. 2, or, as in FIG. 3, in the form of helical turns. It is conceivable, for example, to provide four optical waveguides 14, which can be arranged at uniform spacings of 90° from one another around the press roll 6.

Here, the Bragg gratings can be reflective for the same or different wavelengths, depending on the requirement. If multiple optical waveguides 14 are laid, for example different wavelengths can be chosen for each of the optical waveguides 14, in order to simplify the evaluation.

The optical waveguides 14 are preferably arranged between the roll core 9 and the roll cover 10 or else between different layers of the roll cover 10, if the latter provides multiple layers, or else embedded in a layer.

At least one end 17 of the at least one optical waveguide 14 is led out of the press roll 6 and connected to an evaluation unit, not further illustrated.

The invention is not limited to the exemplary embodiments illustrated; in particular any desired combinations of the features are conceivable and possible.

The invention claimed is:

1. A machine for at least one of producing or processing a fiber web or a tissue web, the machine comprising:
   a press roll defining a cross-machine direction and having a roll core, a roll cover surrounding said roll core and a central region and edge regions in said cross-machine direction;
   a mating roll being a drying cylinder or a Yankee cylinder, said mating roll forming a nip with said press roll, said mating roll having a circumferential surface with a contour running in said cross-machine direction, said contour changing during operation of the machine as compared to a standstill of the machine and said contour being curved during operation at least in some sections; and
   a multiplicity of at least one of pressure sensors or temperature sensors disposed at least one of in said roll cover or between said roll core and said roll cover, said sensors being spaced apart at different distances from one another in said cross-machine direction of said press roll, at least in some areas and said distances between said sensors being smaller in said edge regions than in said central region.

2. The machine according to claim 1, wherein said contour of said mating roll along said cross-machine direction is concave or convex, at least in some sections, during operation.

3. The machine according to claim 1, which further comprises:
   at least one optical waveguide having an extent;
   at least some of said sensors being formed as fiber Bragg gratings disposed along said extent of said at least one optical waveguide; and said at least one optical waveguide having alternatingly disposed sections each containing a fiber Bragg grating and sections being free of fiber Bragg gratings.

4. The machine according to claim 3, wherein said sections of said at least one optical waveguide each containing a fiber Bragg grating enclose an angle with a circumferential direction of said press roll being less than 80°.

5. The machine according to claim 3, wherein:
   said press roll has edge regions and a central region disposed along said cross-machine direction;
   said sections of the same optical waveguide, each containing a fiber Bragg grating, define spacings therebetween; and
   said spacings in said edge regions decreasing with increasing distance from said central region, at least in some regions.

6. The machine according to claim 3, wherein said sections of the same optical waveguide each containing a fiber Bragg grating are adjacently disposed, in said cross-machine direction of said press roll.

7. The machine according to claim 3, which further comprises:
   a region extending in said cross-machine direction over at least part of a length of said press roll in said cross-machine direction;
   said region having an extent in a circumferential direction of less than 15 cm; and
   said sections of the same optical waveguide each containing a fiber Bragg grating being disposed in said region.

8. The machine according to claim 3, wherein:
   said sections of the same optical waveguide each containing a fiber Bragg grating are disposed along a helical curve described on a surface of said press roll; and
   a deviation from said helical curve, both in said cross-machine direction of said press roll and in a circumferential direction of said press roll, is less than 15 cm.

9. The machine according to claim 3, wherein said fiber Bragg gratings of the same optical waveguide, being spaced apart in a direction in which said at least one optical waveguide extends, are constructed to reflect light of different wavelengths.

10. The machine according to claim 3, wherein said fiber Bragg gratings of the same optical waveguide, being spaced apart in a direction in which said at least one optical waveguide extends, are constructed to reflect light of the same wavelength.

11. The machine according to claim 3, wherein said at least one optical waveguide has at least one end being led out of said press roll.

12. The machine according to claim 3, wherein said roll cover has multiple layers and said at least one optical waveguide is disposed between two of said layers or is embedded in one of said layers of said roll cover.

* * * * *